Patented Feb. 20, 1951

2,542,216

UNITED STATES PATENT OFFICE 2,542,216

STABILIZATION OF BENZYL CHLORIDE

Erwin G. Somogyi, Springfield, Mass., assignor to Monsanto Chemical Company, St. Louis, Mo., a corporation of Delaware No Drawing. Application May 3, 1948, Serial No. 24,920

2 Claims. (Cl. 260—651)

This invention relates to the stabilization of benzyl chloride, and more particularly, to novel compositions comprising benzyl chloride and a stabilizer therefor.

Benzyl chloride is a widely used intermediate in the production of benzyl derivatives, such as benzyl alcohol, benzyl benzoate, benzyl cellulose, benzyl acetate and the alkyl benzyl phthalates, and such benzyl derivatives find wide application as pharmaceuticals, plasticizers, rubber chemicals, gasoline gum inhibitors, dyestuffs and perfume bases.

A serious disadvantage in the use of benzyl chloride lies in the fact that benzyl chloride is extremely unstable, oftentimes violently unstable, in the presence of iron, iron oxides or iron salts. Those who are familiar with the handling and use of benzyl chloride recognize that infinite and painstaking care must be exercised in the handling of benzyl chloride, as the slightest contamination, such as a flick of rust in a drum of benzyl chloride, will result in decomposition and darkening of the benzyl chloride with an accompanying evolution of hydrogen chloride. The entire drum of benzyl chloride is then unfit for manufacturing uses and furthermore, the contaminated benzyl chloride is generally not recoverable. Manufacturers of benzyl chloride, particularly anhydrous benzyl chloride take great care to insure that benzyl chloride is packaged in clean nickel drums or nickel-lined containers. However, in spite of all precautions, should a speck of rust get into a container of benzyl chloride and the container be then sealed, the speck of rust will incite the decomposition of the benzyl chloride and the hydrogen chloride evolved due to the decomposition will generate sufficient pressure to cause rupture of the containers, particularly drums. This presents an undesirable aspect for the reason that, not only is the benzyl chloride rendered unfit and lost for manufacturing purposes, but the spilled liquid benzyl chloride is irritating to the skin and the benzyl chloride vapors are highly irritating to the eyes.

A large amount of effort has been expended to try to stabilize benzyl chloride to prevent decomposition of the benzyl chloride in the event that the material is accidently contaminated with iron, rust or iron salts. Benzyl chloride is presently stabilized with a 10% aqueous sodium carbonate solution. Benzyl chloride thus stabilized may be then safely shipped in black iron drums without danger of decomposition in the event of accidental contamination with iron, rust or iron salts. For example, 450 pounds of benzyl chloride mixed with 23 pounds of a 10% aqueous sodium carbonate solution may be safely shipped in a 55-gallon black iron drum. This wet stabilized material is a milky-white emulsion, from which a water layer may separate upon standing. However, before use, the benzyl chloride must be recovered from the stabilized solutions, as anhydrous liquid benzyl chloride is preferred and necessary for most operations. Therefore, at the present time, a user of benzyl chloride must either recover benzyl chloride from the sodium carbonate stabilized aqueous solution, or accept the risk of decomposition due to contamination of the anhydrous liquid benzyl chloride shipped in nickel drums.

It is an object of this invention, therefore, to provide benzyl chloride stabilized against decomposition due to contamination by iron, rust or iron salts. A further object of this invention is to provide anhydrous benzyl chloride stabilized against decomposition due to accidental contamination by iron, rust or iron salts. A still further object is to provide novel compositions comprising benzyl chloride and a stabilizer to prevent decomposition due to accidental contamination by iron, rust or iron salts.

I have discovered that benzyl chloride containing 0.05% to 2% of cyclohexanol is effectively stabilized against decomposition due to contamination by iron, rust or iron salts. In the practice of this invention, a preferred stabilized benzyl chloride composition consists of benzyl chloride and 0.25% of cyclohexanol, and a preferred range of compositions consists of benzyl chloride and 0.1% to 0.5% of cyclohexanol. Such compositions are effectively stabilized against decomposition due to contamination by iron, rust or iron salts under most of the temperature conditions encountered in the handling, storage and transportation of benzyl chloride. Moreover, benzyl chloride thus stabilized with 0.1% to 0.5% of cyclohexanol is not changed in appearance, the physical and chemical properties of the benzyl chloride are not appreciably effected and benzyl chloride thus stabilized may be used in manufacturing processes in the same manner as unstabilized benzyl chloride without the necessity of removing the stabilizing agent prior to the use of the benzyl chloride.

The following examples are illustrative of the method by which this invention may be practiced, however, it is not intended that this invention be limited solely to the methods and compositions as set forth in the following examples:

Example I

Two 55-gallon nickel drums containing anhydrous benzyl chloride were obtained from a commercial manufacturing process. These drums were carefully opened and a composite sample of the two drums obtained. 0.5% of cyclohexanol was added to drum No. 1 and 0.10% of cyclohexanol was added to drum No. 2. About a cup full of rusty iron scrapings were added to each of the drums 1 and 2. The drums were then sealed by connecting them to a pressure manometer to indicate any pressure changes within the drum. As was pointed out hereinbefore, decomposition of benzyl chloride due to rust (iron) contamination is evidenced by an abnormal evolution of hydrogen chloride gas. The pressure generated within a contaminated drum is often large enough to rupture the ends of the drum. However, after six weeks storage under generally encountered temperature conditions of 20°-35° C. (68°-95° F.), the above drums 1 and 2 evidenced no abnormal gas generation. The composite sample obtained from drums 1 and 2, prior to stabilization, was tested in the laboratory by adding a few specks of the rusty iron scrapings to the composite sample. The sample was completely decomposed into a dark brown viscous material in two days.

Example II

A sample of anhydrous benzyl chloride was taken from the production of a commercial process. This sample was divided into two portions in the laboratory and to the one portion was added 0.25% of cyclohexanol as a stabilizing agent. When iron rust scrapings were added to the unstabilized material, the decomposition reaction had set in in about fifty minutes. The reaction became quite violent, accompanied by a vigorous evolution of hydrogen chloride gas and the material became dark blackish brown in color. The portion of the benzyl chloride sample stabilized with 0.25% of cyclohexanol showed no reaction when contaminated with iron rust scrapings and storage for three months at room temperature of 20°-30° C.

Example III

The decomposition of benzyl chloride is instantaneous and extremely violent when benzyl chloride is contaminated with ferric chloride, however, the addition of 0.5% of cyclohexanol to a sample of benzyl chloride will effectively stabilize benzyl chloride even against contamination by ferric chloride. When ferric chloride is added to benzyl chloride containing 0.5% cyclohexanol there appears to be instantaneous immediate reaction, however, this reaction appears to stop almost as quickly as it starts and the decomposition of the benzyl chloride appears to be thereafter completely inhibited.

Example IV

Two 55-gallon nickel drums containing anhydrous benzyl chloride were obtained from a commercial manufacturing process. These drums were carefully opened and a composite sample of the two drums obtained. 0.05% cyclohexanol was added to drum A and 0.10% of cyclohexanol was added to drum B. Rusty iron scrapings were added to each of the drums A and B. The drums were then sealed by connecting them to a pressure manometer to indicate any pressure changes within the drum. The drums were then stored for 52 days under conditions generally encountered during storage and transportation operations, that is, under temperatures varying between 68° F. and 95° F.

The specifications for benzyl chloride which is used in commercial operations usually require that the material distill within the temperature range of 177.5° C. to 185.0° C. Uncontaminated benzyl chloride will very readily distill with a good 96% recovery and the test distillation may be effected with a clean "dry point" within these temperature specifications. However, the distillation of a sample which has been contaminated with iron results in a dark brownish viscous nondistillable residue which will not distill up to a temperature above 200° C. and the heating of which is evidenced by much smoke and the evident thermal decomposition.

Bearing these facts in mind, the composite sample of the benzyl chloride from drums A and B, which were carefully preserved from contamination with iron, was distilled, the first drop of the composite sample coming over at 179.0° C. and with a "dry point" of 183.9° C. Samples of the benzyl chloride from drums A and B were each washed with hydrochloric acid to remove any remaining traces of iron from the benzyl chloride. In view of the fact that the benzyl chloride decomposition products are not soluble in hydrochloric acid, this wash would not remove any decomposition material which might have been present in the stabilized samples. The hydrochloric washed samples from drums A and B which had been stabilized with cyclohexanol, contaminated with rust and held under storage conditions for 52 days were then distilled; the sample from drum A containing 0.05% cyclohexanol distilled with a first drop at a temperature of 178.9° C. and a clean "dry point" of 183.0° C. The sample of benzyl chloride from drum B containing the 0.10% cyclohexanol was distilled with a first drop of 179.0° C. and with a clean "dry point" of 183.0° C.

The preceding results are consistent within the range of experimental error and showed definitely that there was no decomposition of the benzyl chloride during the test period.

Having described and set forth my invention in detail and having given examples showing material improvement of my process over the prior art,

I claim:

1. A composition of matter comprising benzyl chloride and 0.05% to 2% of cyclohexanol.
2. A composition of matter comprising benzyl chloride and 0.1% to 0.5% of cyclohexanol.

ERWIN G. SOMOGYI.

REFERENCES CITED

The following references are of record in the file of this patent:

UNITED STATES PATENTS

| Number | Name | Date |
|---|---|---|
| 2,043,257 | Missbach | June 9, 1936 |
| 2,136,333 | Coleman et al. | Nov. 8, 1938 |
| 2,160,944 | Coleman et al. | June 6, 1939 |
| 2,355,319 | Morris et al. | Aug. 8, 1944 |
| 2,371,644 | Petering et al. | Mar. 20, 1945 |
| 2,407,149 | Gardenier | Sept. 3, 1946 |
| 2,435,887 | Hornbacher et al. | Feb. 10, 1948 |

FOREIGN PATENTS

| Number | Country | Date |
|---|---|---|
| 794,653 | France | Feb. 22, 1936 |